Patented Sept. 22, 1942

2,296,464

UNITED STATES PATENT OFFICE 2,296,464

RUBBER SUBSTITUTE AND METHOD OF MANUFACTURING SAME

Robert Brown, New York, N. Y.

No Drawing. Application March 29, 1940,
Serial No. 326,590

10 Claims. (Cl. 260—112)

The present invention relates to the manufacture of a new and improved rubber substitute from materials of protein character.

I have found that solutions of proteins, and particularly of vegetable proteins, can be subjected to certain chemical treatments to yield a product having many of the properties of natural rubber but, in general, superior to natural rubber in being exceedingly resistant to the action of oils and fats and in having a higher degree of elasticity, combined with great strength.

It is the general object of the invention to prepare a rubber substitute or rubber-like material from a cheap starting substance of protein character, having wide distribution in nature, particularly from vegetable proteins, such as proteins of soya beans.

The process devised by me not only is applicable to a starting material of low cost, but involves treatments of relatively simple nature with quite inexpensive materials, so that a product is obtained which can compete very favorably with natural rubber and can be manufactured in countries where natural rubber trees cannot be grown.

The invention will be described in detail in connection with a starting material obtained from soya beans, but it will be understood that the invention is applicable also to materials of similar composition but obtained from other sources, and particularly vegetable sources.

In carrying out my invention, I first grind soya beans, preferably after they have been dried, to a relatively fine state, such as 20–60 mesh. This meal is now extracted, either in the cold or the heated condition with a suitable solvent for fats in order to extract the oils and fats contained in the natural beans. I have found a solvent composed of 50 parts of methanol and 50 parts of ethylene dichloride to be highly satisfactory, although other solvents or solvent mixtures, such as a mixture containing ethanol, may be employed. The extraction should be very thorough, preferably leaving a residue of oil which is no greater than about ¼% of the weight of the beans. If desired, the original beans may be subjected to a pressure extraction of the oily material, the residue being then ground and treated with a solvent for fats and oils, as just described.

The de-fatted bean meal, after separation from the solvent, may now be heated to drive off the solvent, care being however taken not to employ so high a temperature as may injure the proteins. The dried bean meal is now suspended in about 8 times its weight of water. If desired, the suspension may be subjected to the action of sodium bisulfite, in order to effect disintegration of the cellular material and thus facilitate the subsequent extraction of the proteins, the mixture being stirred for a half hour or more, as described in my United States Patent, No. 1,866,698, granted July 12, 1932. The treatment with sodium bisulfite is, however, not necessary and may be omitted. I now add to the suspension of bean meal in water, about 12—20% of quicklime, based on the weight of dry, de-fatted beans, the quicklime being preferably in a finely ground condition. The mixture is now stirred vigorously for about an hour and allowed to stand for a time, for example an hour or two or longer, the stirring and standing being preferably repeated twice, the mixture being allowed to settle after the last stirring, such settling usually requiring a period of several hours.

The supernatant liquid may now be drawn off and the precipitate subjected to filtration, or the whole mixture can be filtered, preferably through thick filter cloth. The first portion of liquid passing through the filter may be cloudy and in such case should be returned to the filtering apparatus and this operation repeated, if necessary, until a clear, yellowish, viscous solution is obtained which resembles a resin solution. The filtered liquid contains the calcium compound of the protein material together with certain sugars and resinous materials extracted from the bean meal together with calcium hydroxide in solution.

The clear viscous solution so obtained is now diluted with an equal amount of water, and to each 100 volumes of diluted solution there is added 1 volume of 40% formaldehyde solution. A considerably smaller proportion of formaldehyde can, if desired, be employed. The formaldehyde aids in preserving the organic solution against putrefactive influences and, in addition, exerts a desirable hardening effect on the final, dried product. The formaldehyde-treated solution is stirred and then subjected to the action of a slow stream of chlorine for a short time. The rate of feed and the quantity of chlorine will of course depend upon the volume of liquid being treated, but I have found that in a series of small batches of 50 cc. of solution, a slow bubbling through of chlorine for about 5 seconds gives satisfactory results. Comparable results with larger volumes of solution can be obtained by suitable regulation of the feed of chlorine after simple experiment.

The chlorine-treated solution is agitated and then allowed to stand for about three days, during which time a slow reaction, probably a polymerization or coagulation, occurs. When this material was spread upon a surface in the form of a film and dried in a steam bath, a clear soft film was obtained which had many of the properties of rubber, although it was not highly elastic. This material could be employed for many of the uses to which raw rubber is put.

I prefer however to further treat the chlorine-treated solution in the following manner, as thereby a film of greater elasticity is obtained.

The chlorine-treated solution, after standing for three days or more, preferably with intermittent agitation, is treated with carbon disulfide in the proportion of 2:4 cc. of disulfide to 50 cc. of the solution. The mixture is stirred and then a slow stream of chlorine again bubbled through the solution, this time for only about three seconds in the case of a 50 cc. batch. The mixture is vigorously stirred and, if desired, after a period of standing, is spread upon a surface in the form of a thin film and allowed to dry at atmospheric temperature. There is obtained a rubbery film of brownish color which is remarkable for its very high elasticity, which is considerably greater than that of natural rubber. This synthetic material is characterized also by great strength and also by being entirely unaffected by fats, oils and greases, so that it is particularly suitable for the manufacture of gaskets and the like.

A clearer film may be obtained by dialyzing the solution to remove salts dissolved therein, although this is not necessary for the production of a rubbery material having the properties above described.

The storage of the chlorine-treated protein solution preferably takes place in the dark, as the light seems to hinder or delay the coagulation or polymerization. If the solution becomes cloudy after the addition of the carbon disulfide, it may be filtered; most of the suspended matter, that is, the cloudy matter, passes through the filter. It is of colloidal nature and is not granular.

On heating to temperatures above 300° F. and even at temperatures in the neighborhood of 300° F. the product gradually loses its elasticity finally becoming brittle and turning into a dark brown powder. The rubbery material does not soften to any considerable extent on heating and is infusible.

The nature of the product is not yet known and it appears to be a chlorinated material which contains also sulfur groups in chemical combination. The conversion to the non-elastic brittle form on heating indicates that the sulfur and perhaps also the chlorine act as vulcanizing agents. The product appears to be a type of irreversible gel for although it will mix uniformly with water, even after the carbon disulfide treatment, nevertheless, once the aqueous film has been dried, the product is water-insoluble. A remarkable property of the product is that although it originated in a material which is readily soluble in alkalis, it is itself not soluble in alkalis being apparently not attacked over a considerable period of time even by a 25% solution of sodium hydroxide.

The dried material is quite soft and may be employed as a plasticizer in the manufacture of nitrocellulose lacquers, and in general in the manufacture of cellulosic plastics. It may also be combined with known resinous materials in the manufacture of coating and molding compositions in the same way that casein and other proteid substances have heretofore been employed.

The proportions and times indicated above are given purely by way of illustration and can obviously be changed, especially when larger batches are worked with, within the scope of the invention as defined by the appended claims. Thus, the calcium hydyroxide can be replaced by sodium hydroxide, or by other alkaline agents such as the alkali metal carbonates which are solvents for proteins and related substances.

I claim:

1. A process for the manufacture of a rubber substitute comprising subjecting a coagulable vegetable protein material to the action of chlorine and carbon disulfide.

2. A process for the manufacture of a rubber substitute comprising subjecting a solution of soya bean proteins to the action of formaldehyde and chlorine, allowing the so treated solution to stand for a period of time, adding carbon disulfide thereto, again treating the solution with chlorine, and finally evaporating the solution.

3. A process for the manufacture of a rubber substitute comprising treating de-fatted soya bean meal with a solution of calcium hydroxide, separating the solution of proteins so obtained, subjecting the same to the action of formaldehyde, chlorine and carbon disulfide, and subsequently evaporating the solution.

4. A process for the manufacture of a rubber substitute comprising treating de-fatted soya bean meal with a solution of calcium hydroxide, separating the solution of proteins so obtained, adding formaldehyde thereto, bubbling chlorine through the solution, allowing the solution to stand for a period of several days, adding about 4–8% of carbon disulfide by volume based upon the volume of protein solution, again bubbling chlorine through the solution, and subsequently drying the solution.

5. A rubber substitute comprising a formaldehyde, chlorine and carbon disulfide-treated protein component of soya beans.

6. A highly elastic, brownish, film obtained by evaporating a solution of soya bean proteins after treatment with chloride, carbon disulfide and again with chlorine.

7. A water and alkali insoluble chlorinated and carbon disulfide-treated coagulated vegetable protein material.

8. A water and alkali insoluble elastic, rubber substitute obtained by treating a calcium hydroxide solution of soya bean proteins with formaldehyde, chlorine and carbon disulfide.

9. A coating composition having incorporated therein a chlorine and carbon disulfide-treated coagulated vegetable protein material.

10. A molding composition having incorporated therein a formaldehyde, chlorine and carbon disulfide-treated coagulated vegetable protein material.

ROBERT BROWN.